(12) United States Patent
Hasuda (10) Patent No.: US 8,264,556 B2
(45) Date of Patent: Sep. 11, 2012

(54) LENS BARREL UNIT

(75) Inventor: Masanori Hasuda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/232,605

(22) Filed: Sep. 19, 2008

(65) Prior Publication Data
US 2009/0033751 A1 Feb. 5, 2009

Related U.S. Application Data

(63) Continuation of application No. 11/012,304, filed on Dec. 16, 2004, now abandoned.

(30) Foreign Application Priority Data

Dec. 26, 2003 (JP) .................................. 2003-431889

(51) Int. Cl.
*H04N 5/228* (2006.01)
*H04N 5/225* (2006.01)
*G02B 27/64* (2006.01)
*G03B 17/00* (2006.01)
*G03B 13/22* (2006.01)
*G03B 13/34* (2006.01)

(52) U.S. Cl. ............. 348/208.7; 348/208.99; 348/208.2; 348/208.5; 348/335; 348/360; 348/374; 359/554; 359/557; 396/52; 396/55; 396/91; 396/132

(58) Field of Classification Search ............. 348/208.99, 348/208.2, 208.5–208.7, 208.11, 208.16, 348/335, 360, 374; 359/554–557, 808–830; 396/52–55, 91, 132
See application file for complete search history.

(56) References Cited

U.S. PATENT DOCUMENTS

| | | |
|---|---|---|
| 5,398,132 A | 3/1995 | Otani |
| 5,555,061 A | 9/1996 | Soshi et al. |
| 5,557,357 A | 9/1996 | Soshi et al. |
| 5,598,246 A | 1/1997 | Miyamoto et al. |
| 5,614,974 A | 3/1997 | Soshi et al. |
| 5,666,563 A | 9/1997 | Iijima et al. |
| 5,677,791 A | 10/1997 | Yoshibe et al. |
| 5,680,251 A | 10/1997 | Kato et al. |
| 5,708,865 A | 1/1998 | Soshi et al. |
| 5,831,671 A | 11/1998 | Chigira et al. |
| 5,926,656 A | 7/1999 | Imura et al. |
| 5,974,269 A | 10/1999 | Sato et al. |
| 6,112,028 A | 8/2000 | Okada |
| 6,225,614 B1 | 5/2001 | Ono |
| 6,498,624 B1 | 12/2002 | Ogura et al. |

(Continued)

FOREIGN PATENT DOCUMENTS

JP 3-218182 9/1991

(Continued)

OTHER PUBLICATIONS

Office Action mailed Mar. 19, 2008 in U.S. Appl. No. 11/012,304.

(Continued)

*Primary Examiner* — Jason Chan
*Assistant Examiner* — Michael Osinski (57) ABSTRACT

A lens barrel unit includes gyro sensors that detect vibration. The gyro sensors are disposed around a CCD mounting portion within a range over which the lens barrel unit is projected along the optical axis of a photographic optical system. This positional arrangement allows the lens barrel unit to be provided as a compact retractable unit, and ultimately achieves miniaturization of the camera.

8 Claims, 6 Drawing Sheets

U.S. PATENT DOCUMENTS

| | | | |
|---|---|---|---|
| 6,735,383 B2 | 5/2004 | Imade | |
| 6,930,708 B1 * | 8/2005 | Sato et al. | 348/208.99 |
| 2002/0176713 A1 | 11/2002 | Kai et al. | |
| 2003/0214599 A1 * | 11/2003 | Ito et al. | 348/335 |

FOREIGN PATENT DOCUMENTS

| | | |
|---|---|---|
| JP | 6-46314 | 2/1994 |
| JP | 07-181358 | 7/1995 |
| JP | 7-270847 | 10/1995 |
| JP | 7-281233 | 10/1995 |
| JP | 08-237556 | 9/1996 |
| JP | 9-80552 | 3/1997 |
| JP | 09-160107 | 6/1997 |
| JP | 11-167175 | 6/1999 |
| JP | 2000-269472 | 9/2000 |
| JP | 2002-207148 | 7/2002 |
| JP | 2002-303909 | 10/2002 |
| JP | 2003-111449 | 4/2003 |
| JP | 2003-130647 | 5/2003 |

OTHER PUBLICATIONS

Pisheh, Z.; Sheikhi, A., "Detection and compensation of image sequence jitter due to an unstable CCD camera for video tracking of a moving target," Sep. 6-9, 2004, pp. 258-261.

U.S. Appl. No. 11/012,304, filed Dec. 16, 2004, Masanori Hasuda, Nikon Corporation.

Japanese Office Action issued Mar. 9, 2010 in corresponding Japanese Patent Application 2003-431889.

* cited by examiner

LENS BARREL UNIT

CROSS-REFERENCE TO RELATED APPLICATIONS

This application is a continuation of U.S. application Ser. No. 11/012,304, filed Dec. 16, 2004 now abandoned, which further claims the benefit of priority of Japanese Patent Application No. 2003-431889 filed Dec. 26, 2003, the contents of which are incorporated herein by reference.

BACKGROUND OF THE INVENTION

1. Field of the Invention

The present invention relates to a lens barrel unit that is built into a camera capable of executing blur correction to correct an image blur caused by unsteady hand movement.

2. Description of the Related Art

A camera in which blur correction control is executed to correct image blur caused by unsteady hand movement or the like normally includes a vibration sensor that detects vibration in the camera. The blur correction control is executed by driving a blur correction optical system or an image-capturing element based upon the results of the detection provided by the vibration sensor.

Japanese Laid Open Patent Publication No. H 9-160107 discloses a camera with a built-in lens barrel unit, which uses a non-interchangeable lens. In this camera, two vibration sensors used for the blur correction control are disposed in the grip of the camera, away from the lens barrel unit, so as to provide the camera as a compact unit.

Extremely fine control is required during a blur correction operation. Accordingly, it is necessary to perform an integrated adjustment and inspection by adjusting the vibration sensor and the blur correction drive unit in conjunction with each other when assembling a camera having a blur correction mechanism.

However, if the vibration sensor is disposed at a distance from the lens barrel unit, as in the camera described above, the adjustment and inspection of the blur correction mechanism cannot be performed unless the lens barrel unit is already mounted in the camera.

SUMMARY OF THE INVENTION

A lens barrel unit according to a first aspect of the present invention comprises a photographic optical system; a drive force generating unit that generates a drive force with which the photographic optical system is caused to move; a drive mechanism that moves the photographic optical system with the drive force received from the drive force generating unit; an image-capturing element mounting portion at which an image-capturing element that captures an image obtained through the photographic optical system is mounted; and a vibration detection device that detects vibration and is disposed in an area surrounding the image-capturing element mounting portion within a range in which the lens barrel unit is projected along an optical axis of the photographic optical system.

The drive force generating unit generates the drive force so as to cause the photographic optical system to move along the optical axis; and the drive force generating unit and the vibration detection device are disposed at positions facing opposite each other over the image-capturing element mounting portion.

It is preferable that the vibration detection device includes two vibration sensors; and the vibration sensors are both disposed in the area surrounding the image-capturing element mounting portion within the range in which the lens barrel unit is projected along the optical axis of the photographic optical system. The two vibration sensors may be mounted on a sensor board constituted of a hard board; and the sensor board may be fixed onto a member constituting the image-capturing element mounting portion as an integrated part thereof. The two vibration sensors may also be mounted on a hard board which is disposed in a plane substantially perpendicular to the optical axis and in the area surrounding the image-capturing element mounting portion within the range in which the lens barrel unit is projected along the optical axis of the photographic optical system.

The lens barrel unit according to the first aspect further comprises a terminal unit that achieves an electrical connection with an external device, and at least one of an adjustment operation and an inspection operation related to a blur correction operation is executed based upon detection results provided by the vibration detection device with power supply and control communication achieved via the terminal unit.

The lens barrel unit according to the first aspect may further comprise a retract motor that generates a drive force to reduce a length of the lens barrel unit.

A lens barrel unit according to a second aspect of the present invention comprises a photographic optical system that includes a blur correction optical system; a vibration detection device that is disposed in an area surrounding an image-capturing element mounting portion at a position which does not project out along a radial direction beyond an outermost perimeter of the lens barrel unit and detects vibration occurring along two directions perpendicular to an optical axis of the photographic optical system; and a blur correction drive unit that drives the blur correction optical system in correspondence to a detection value provided by the vibration detection device.

A camera according to a third aspect of the present invention comprises a lens barrel unit according to claim 1 that is built in the camera.

DETAILED DESCRIPTION OF THE PREFERRED EMBODIMENTS

The following is an explanation of a lens barrel unit achieved in an embodiment of the present invention, given in reference to the drawings.

Figure 1:
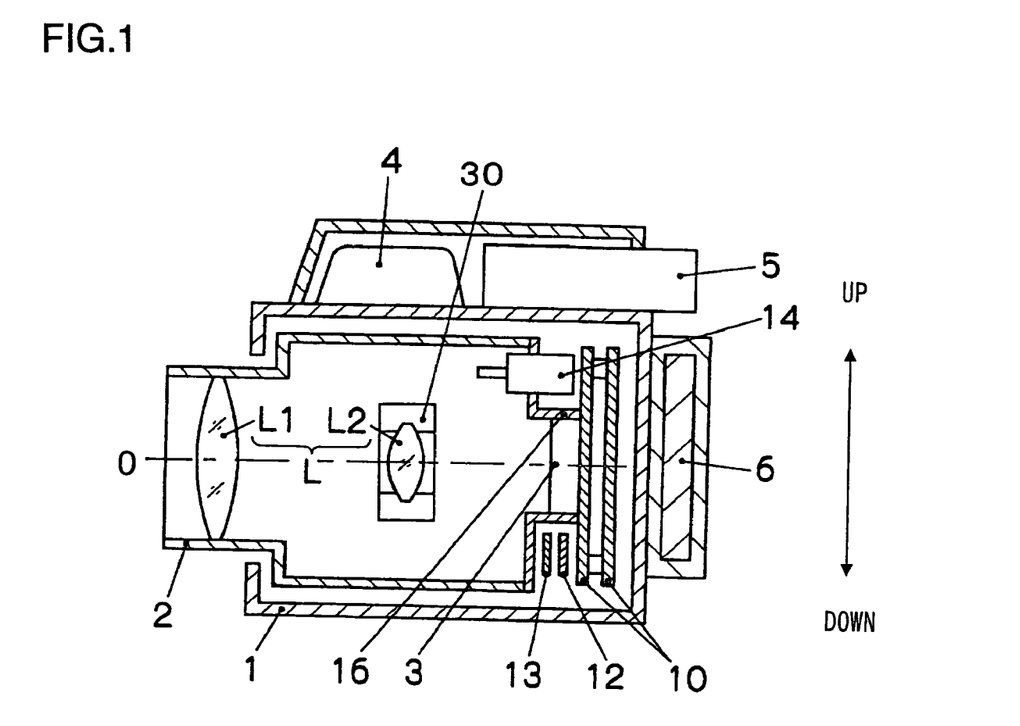
FIG. 1 shows a vertical section of an area around the center of the optical axis in a camera having a lens barrel unit achieved in an embodiment of the present invention.
Figure 2:
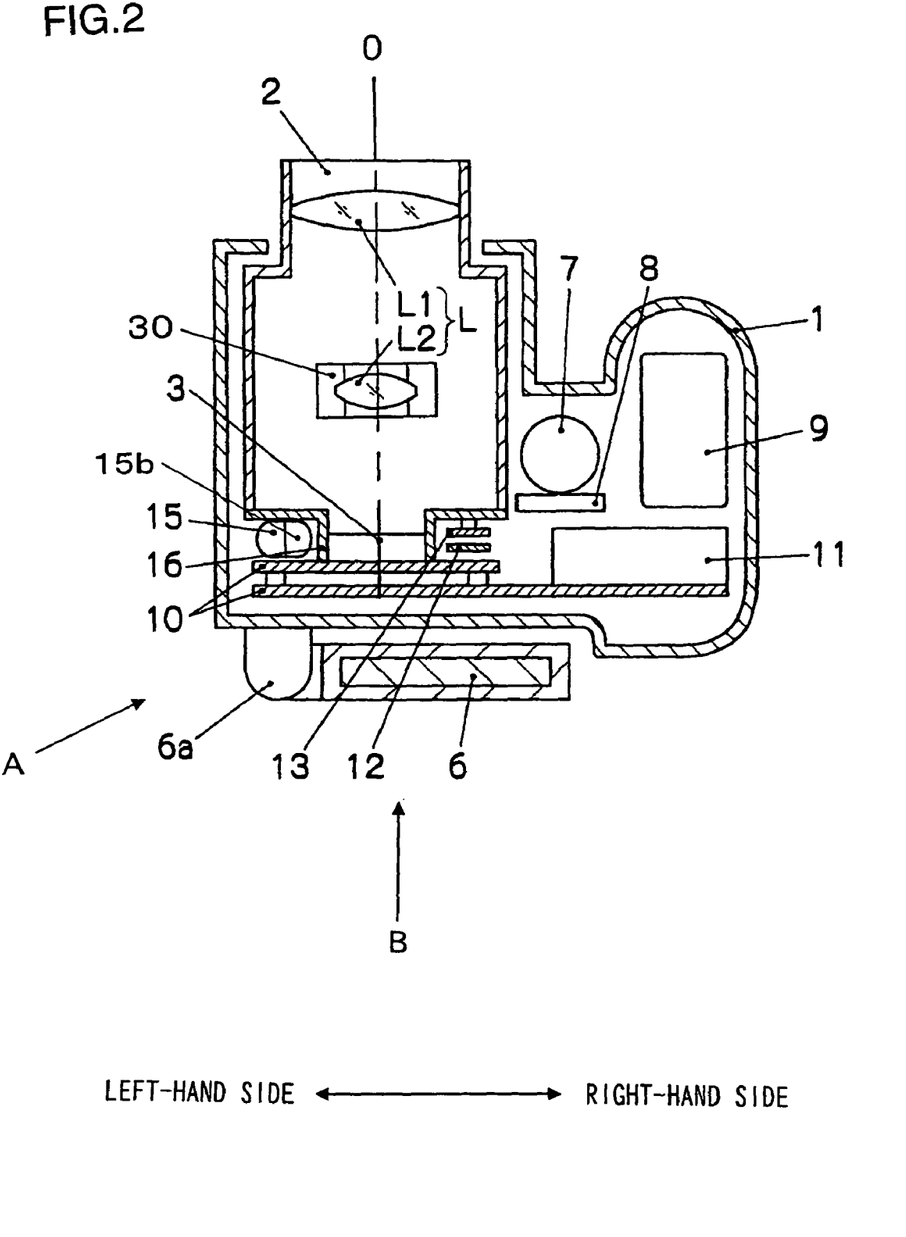
FIG. 2 shows a horizontal section of the area around the center of the optical axis in the camera shown in FIG. 1.

FIG. 1 is a vertical section of an area around the center of an optical axis in a camera having a lens barrel unit 2 achieved in the embodiment. FIG. 2 is a horizontal section of the area around the center of the optical axis in the camera shown in FIG. 1. As shown in FIGS. 1 and 2, the camera uses a non-interchangeable lens with the lens barrel unit 2 built therein. In a single lens reflex camera in which an interchangeable lens is used, a vibration sensor used to detect vibration is mounted between, for instance, a photographic optical system of the interchangeable lens and a mounting portion of the interchangeable lens at a position outside the optical path so as not to block the light flux.

In a camera with a non-interchangeable lens such as the camera achieved in the embodiment, the length of the lens barrel is usually reduced and the lens is retracted when, for instance, the power is turned off so as to be handled as a more compact unit. Since the lens frame member moves by a significant extent along the optical axis when the lens retracts, it is difficult to dispose the vibration sensor around the optical path as in a camera with an interchangeable lens, as described above.

Moreover, if the lens barrel and the vibration sensor are disposed away from each other in order to achieve miniaturization of the camera, it will be difficult to adjust and inspect the blur correction mechanism with ease during the assembly process, which is bound to result in an increase in production costs.

Accordingly, the positional arrangement of vibration sensors used in the embodiment to detect vibrations of the camera is improved so as to achieve miniaturization of the camera without leading to a cost increase.

As shown in FIGS. 1 and 2, the camera achieved in the embodiment includes a camera main body 1, the lens barrel unit 2, a CCD 3, a flash light emitting unit 4, an electronic viewfinder (EVF) 5, a monitor 6, a main condenser 7, a flash light emitter board 8, a battery 9, a camera control board 10, a memory card unit 11, a blur correction board 12, a gyro board 13, a focus motor 14, a zoom motor 15, a retract motor 15*b*, a CCD mounting member 16, a photographic optical system L and the like.

The camera main body 1 is constituted of a cover member which forms the outer casing of the camera. The camera main body 1 is a member that constitutes the base of the entire camera, at which the various units mentioned above are mounted.

The lens barrel unit 2 includes the photographic optical system L, the blur correction board 12, the gyro board 13, the focus motor 14, the zoom motor 15, the retract motor 15*b*, the CCD mounting member 16 and the like. The photographic optical system L includes a lens L1, a blur correction lens L2 (blur correction optical system) and the like. As the blur correction lens L2 is driven by a blur correction drive unit 30 so as to move along a direction perpendicular to an optical axis O, it engages in a blur correction operation for correcting an image blur.

The lens barrel unit 2, its components and the like are to be explained later.

The CCD 3 is an image-capturing element that captures an image formed through the photographic optical system L at its image-capturing surface. The CCD 3 is locked to a CCD mounting portion 16*a* (see FIG. 3) of the CCD mounting member 16.

The flash light emitting unit 4 is disposed atop the camera main body 1 and includes a flash light emitter (not shown) that emits auxiliary illuminating light during a photographing operation. The flash light emitter, which is stored at a storage position when not in use, is either automatically or manually popped up to an operating position as necessary.

The electronic viewfinder (EVF) 5 is a display unit disposed further toward a photographer relative to the flash light emitting unit 4 at the top of the camera. As the photographer looks into an eyepiece portion of the EVF 5, he is able to observe a subject image obtained via the CCD 3.

The monitor 6, which is disposed on the rear side (the surface facing toward the photographer) of the camera, is a display unit constituted with a liquid crystal display device larger than the EVF 5. At the monitor 6, the subject image obtained via the CCD 3 and information such as the details of the settings selected for the camera are displayed. The monitor 6 can be oriented in any direction on a fulcrum set at a hinge portion 6*a* thereof.

The main condenser 7 is a condenser that stores the energy required to emit light in the flash light emitting unit 4. As shown in FIG. 2, with the side of the camera held by the right-hand of the photographer holding the camera sideways referred to as the right-hand side and the opposite side of the camera referred to as the left-hand side, the main condenser 7 is disposed further on the right-hand side relative to the lens barrel unit 2 and further toward the subject relative to the flash light emitter board 8.

The flash light emitter board 8, which is connected with the flash light emitting unit 4, the main condenser 7, the camera control board 10 and the like, is a board at which circuits required for flash light emission are formed. The flash light emitter board 8 is disposed at a position which is substantially the same as the position of the main condenser 7 but is further toward the photographer relative to the main condenser 7.

The battery 9, from which power is supplied to the camera, is disposed inside the grip by which the right-hand of the photographer holds the camera.

The camera control board 10 is a board at which a circuit that controls the main operations of the camera is formed and is fixed to the CCD mounting member 16.

The memory card unit 11 reads/writes data in a memory card used as a storage medium in which photographic image data are stored and is fixed to the camera control board 10.

The focus motor 14 is a drive force generating unit that generates a drive force with which a focus lens (not shown) inside the photographic optical system L is driven via a drive mechanism constituted with a lens frame (not shown) and the like. The focus motor 14 is disposed above the CCD mounting portion 16*a*. The focus lens is caused to move along the optical axis O by the drive force imparted by the focus motor 14.

The zoom motor 15 is a drive force generating unit that generates a drive force for adjusting the focal length of the photographic optical system L via a drive mechanism constituted with a zoom gearbox 15*a* (see FIG. 3), the lens frame (not shown) and the like. A lens which is part of the photographic optical system L and adjusts the focal length is caused to move along the optical axis O by the drive force imparted from the zoom motor 15. The zoom motor 15 and the zoom gearbox 15*a* are disposed on the left-hand side of the CCD mounting portion 16*a*.

The retract motor 15*b* generates a drive force for retracting with which the length of the lens barrel unit 2 is reduced so as to achieve miniaturization of the camera. It is to be noted that the zoom motor 15 may be used as the retract motor 15*b*.

It is to be noted that the focus motor 14, the zoom motor 15 and the retract motor 15*b* are electrically connected with the camera control board 10 through wiring (not shown).

Next, the lens barrel unit 2 is explained in further detail.

Figure 3:
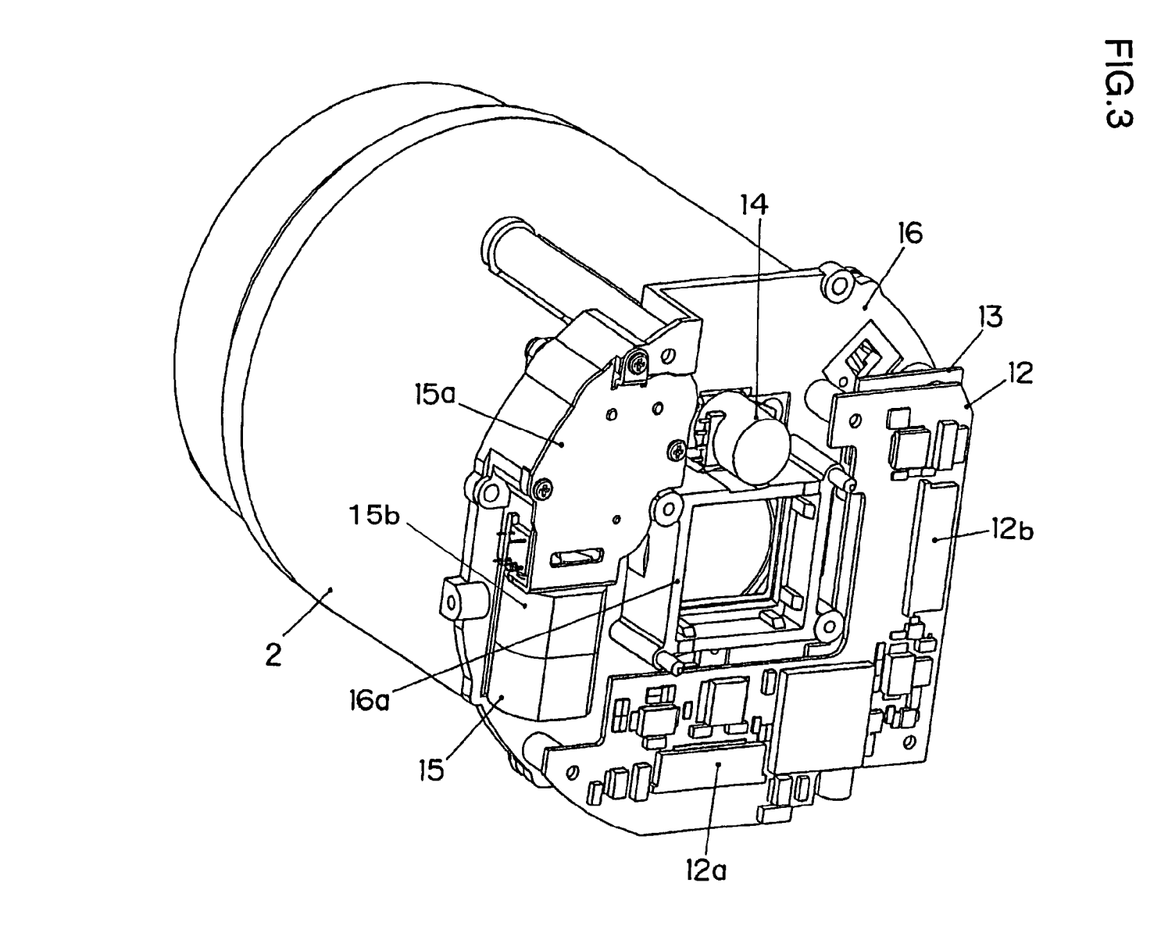
FIG. 3 is a perspective of the lens barrel unit, viewed from the side indicated by the arrow A in FIG. 2.

FIG. 3 is a perspective of the lens barrel unit 2, viewed from the side indicated by the arrow A in FIG. 2.

Figure 4:
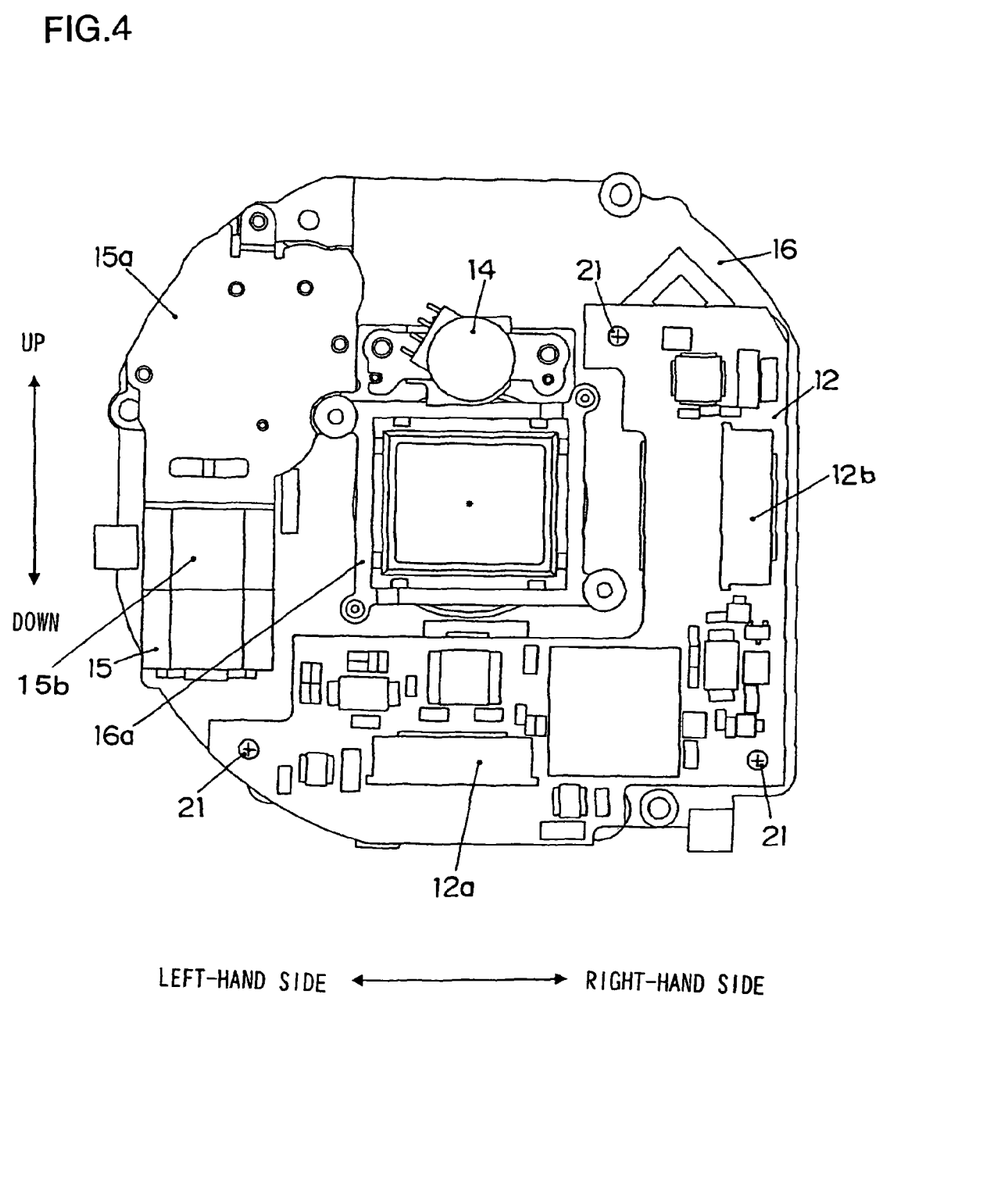
FIG. 4 shows the lens barrel unit viewed from the side indicated by the arrow B in FIG. 2.

FIG. 4 shows the lens barrel unit 2, viewed from the side indicated by the arrow B in FIG. 2.

The CCD mounting member 16 includes the CCD mounting portion 16*a*, which is an image-capturing element mounting portion, and screw holes at which the blur correction board 12, the gyro board 13 and the like are fixed, are formed at the CCD mounting member 16. Excluding its CCD mounting portion 16a, i.e., excluding the portion around the optical axis O, the CCD mounting member 16 adopts a shape that allows it to cover a section of the lens barrel unit 2.

The blur correction board 12 is a hard board at which a drive circuit engaged to drive a VCM (voice coil motor) of the blur correction drive unit 30 and the like are formed. The VCM causes the blur correction lens L2 to move along a direction perpendicular to the optical axis O. The blur correction board 12, which is disposed in a substantially L shape so as to enclose the lower portion and the right-hand side of the CCD mounting portion 16a of the CCD mounting member 16, is locked onto the CCD mounting member 16 with screws 21 disposed at three positions. The blur correction drive unit 30 is electrically connected with the blur correction board 12 via wiring (not shown).

A terminal unit 12a that electrically connects with an external inspection device is provided at the blur correction board 12. When adjusting and inspecting the lens barrel unit 2, it is connected with the external inspection device through the terminal unit 12a to achieve power supply and control communication, and as a result, an adjustment operation and an inspection operation related to the blur correction operation can be executed based upon the results of detection provided by gyro sensors 17 and 18 to be detailed later. A terminal unit 12b is electrically connected with the camera control board 10 via wiring (not shown)

Figure 5:
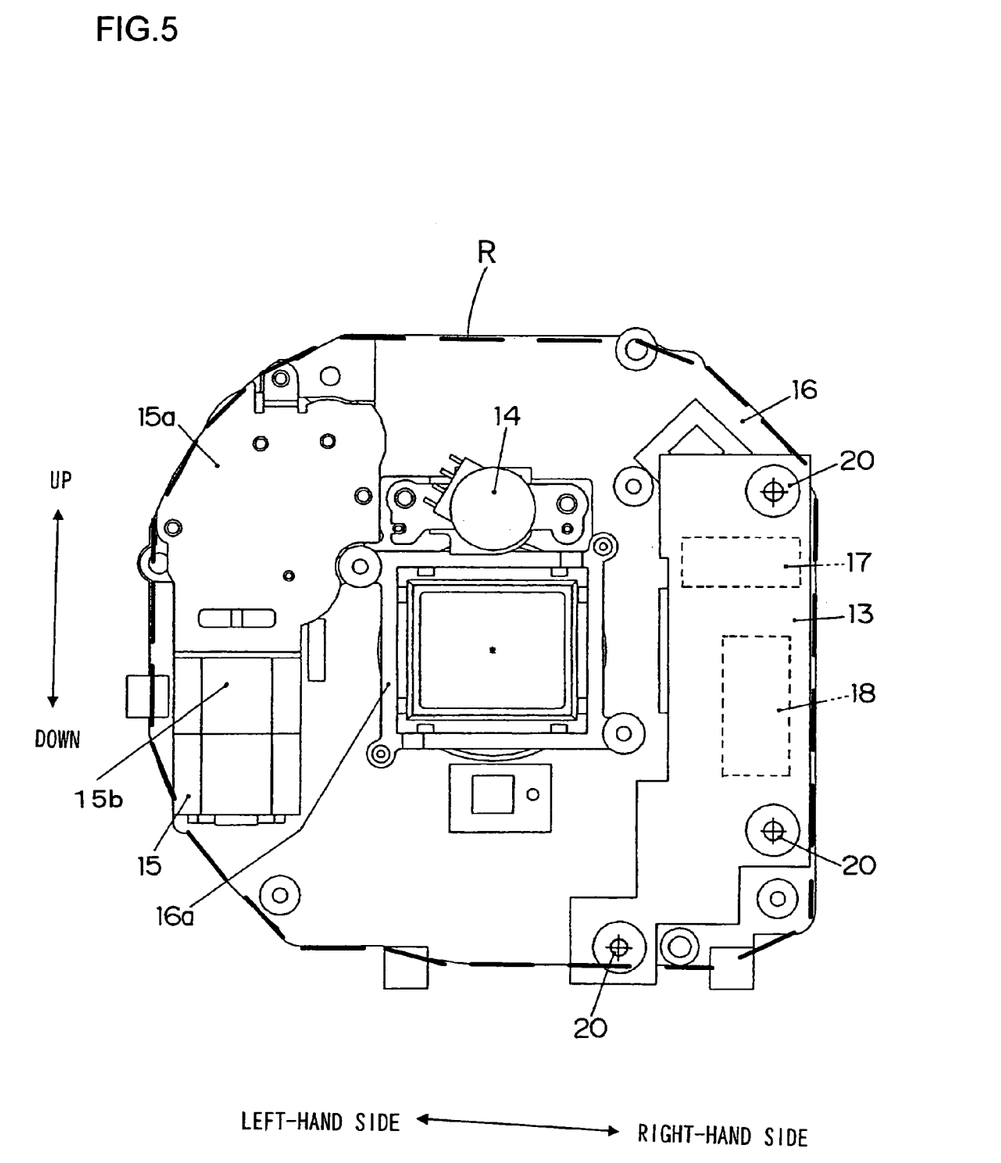
FIG. 5 shows the lens barrel unit in FIG. 4 without a blur correction board.

FIG. 5 shows the lens barrel unit 2 in FIG. 4 with no blur correction board 12 installed therein.

Figure 6:
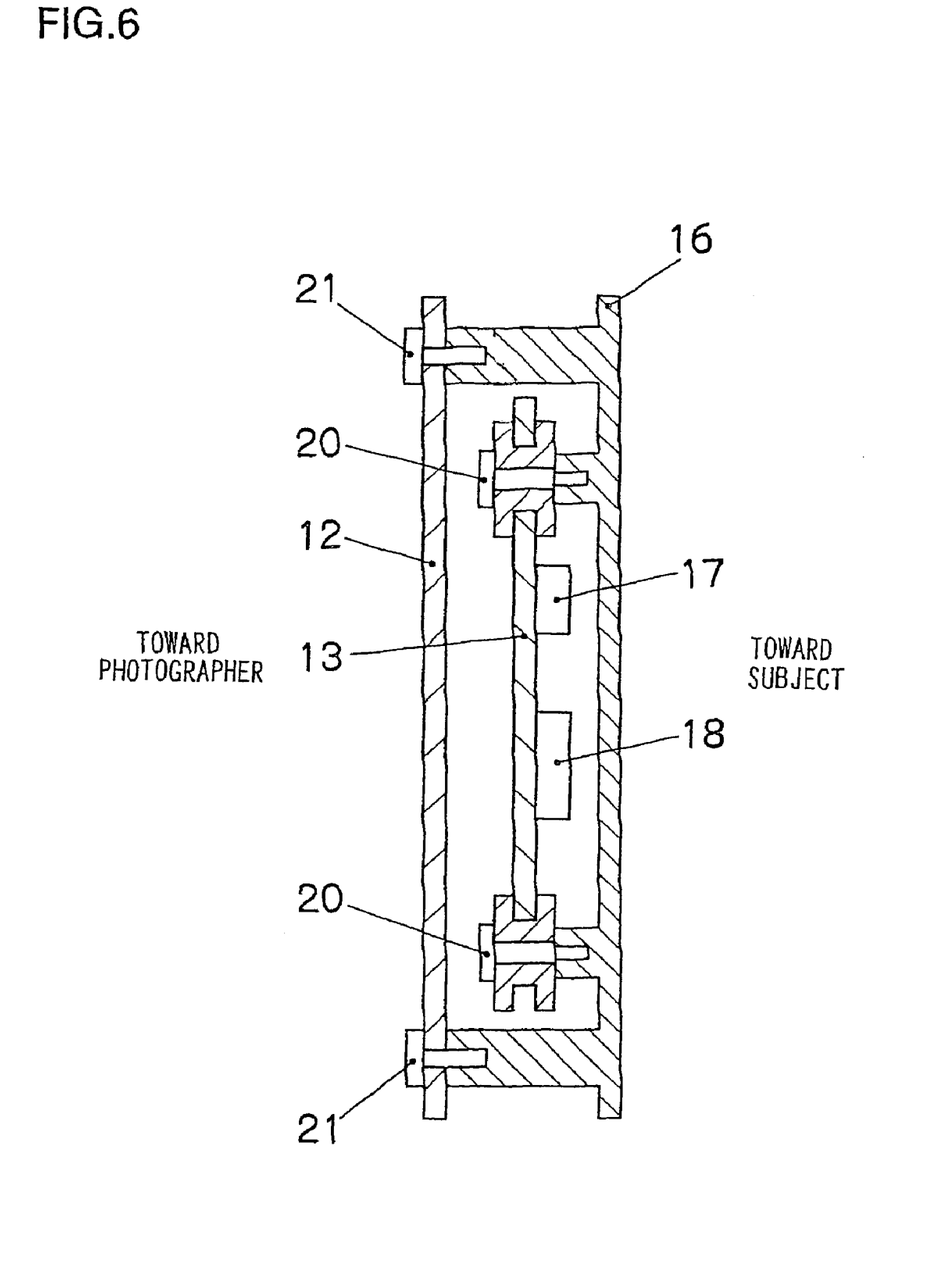
FIG. 6 is a longitudinal sectional view schematically showing the relationship between the blur correction board and the gyro board.

FIG. 6 is a longitudinal sectional view schematically showing the relationship between the blur correction board 12 and the gyro board 13. The blur correction board 12 and the gyro board 13 are electrically connected with each other through wiring (not shown).

The gyro board 13 having the gyro sensors 17 and 18 mounted thereupon is a sensor board constituted with a hard board. The 13 is disposed on the right-hand side relative to the CCD mounting portion 16a of the CCD mounting member 16 further toward the subject relative to the blur correction board 12. In other words, the gyro board 13 is disposed in a plane substantially perpendicular to the optical axis O around the CCD mounting portion 16a within a range over which the lens barrel unit 2 is projected along the optical axis O of the photographic optical system L. The gyro board 13 is fixed to the CCD mounting member 16 so as to form an integrated part thereof through screws 20 disposed at three positions.

The gyro sensors 17 and 18 are vibration sensors used to detect vibrations of the camera and are mounted at the surface of the gyro board 13 facing toward the subject. The gyro sensors 17 and 18 are the same type of vibration detector and are respectively disposed along the horizontal direction and the vertical direction in FIG. 5. The gyro sensors 17 and 18 respectively detect vibrations manifesting along the horizontal direction and the vertical direction in FIG. 5, running perpendicular to each other. The detection values provided by the gyro sensors 17 and 18 are output to the drive circuit formed on the blur correction board 12. The blur correction drive unit 30 drives the blur correction lens L2 along the direction perpendicular to the optical axis O in correspondence to the detection values provided by the gyro sensors 17 and 18 and thus, the blur correction operation is executed.

As shown in FIG. 5, the gyro sensors 17 and 18 are disposed around the CCD mounting portion 16a within the range R over which the lens barrel unit 2 is projected along the optical axis O of the photographic optical system L. This range R matches the outer perimeter of the lens barrel unit 2. For this reason, the gyro sensors 17 and 18 can be regarded to be disposed at positions at which they do not project out along the radial direction beyond the outermost perimeter of the lens barrel unit 2. This positional arrangement allows the lens barrel unit 2 to be provided as a compact and retractable lens barrel unit by effectively utilizing the available space around the CCD 3.

The gyro sensors 17 and 18 are disposed at positions facing opposite the zoom motor 15 over the CCD mounting portion 16a. Since this positional arrangement creates a significant distance from the gyro motors 17 and 18 to the zoom motor 15, the vibration occurring when the zoom motor 15 is being driven is not allowed to be transmitted to the gyro sensors 17 and 18 readily.

If the zoom motor 15 was disposed near the gyro sensors 17 and 18, on the other hand, the vibration occurring as the zoom motor 15 is driven would be picked up at the gyro sensors 17 and 18, which may lead to an erroneous operation in the blur correction control. However, since the gyro sensors 17 and 18 are disposed over a considerable distance from the zoom motor 15 in the embodiment, such erroneous operation can be avoided.

It is to be noted that the focus motor 14 is disposed at a position closer to the gyro sensors 17 and 18 compared to the zoom motor 15. However, since the extent of vibration occurring at the focus motor 14 is relatively small compared to the extent of vibration occurring at the zoom motor 15, the likelihood of an erroneous operation is not high. However, it is desirable that the focus motor assume a position similar to that of the zoom motor 15 if the extent of vibration occurring at the focus motor is great.

Since the gyro sensors 17 and 18 are disposed at the lens barrel unit 2, the adjustment and inspection operations related to the blur correction operation can be executed for the lens barrel unit 2 by itself, instead of on the finished camera product after the assembly process.

The focus motor 14 and the zoom motor 15 are both disposed within the range R over which the lens barrel unit 2 is projected along the optical axis O of the photographic optical system L, as are the gyro sensors 17 and 18. By disposing the relatively large members such as the focus motor 14, the zoom motor 15 and the gyro sensors 17 and 18 in the available space around the CCD 3 as described above, the lens barrel unit 2 can be provided as a more compact unit and thus, miniaturization of the overall camera is achieved.

In the embodiment described above, the gyro sensors 17 and 18 are used as a vibration detection device. However, the present invention is not limited to this example, and it may be adopted in conjunction with another type of angular speed sensors capable of detecting vibrations manifesting along two directions perpendicular to the optical axis O.

EXAMPLE OF VARIATION

The present invention is not limited to the example presented in the explanation of the embodiment above, and it allows for various changes and modifications and such changes and modifications equally fall into the scope of the present invention.

The present invention is adopted in the lens barrel unit 2 that executes the blur correction operation by moving the blur correction lens L2 in the embodiment described above. However, the present invention is not limited to this example and it may be adopted in a lens barrel unit that executes blur correction by moving, for instance, the image-capturing element.

The following is a summary of the lens barrel unit achieved in the embodiment of the present invention.

(1) The vibration sensors 17 and 18 used to detect vibrations are disposed around the image-capturing element mounting portion 16a within the range R over which the lens barrel unit 2 is projected along the optical axis O of the photographic optical system 1. Thus, the available space around the image-capturing element 3 can be effectively utilized to provide a compact and retractable lens barrel unit 2.

(2) The drive force generating unit 15 that imparts the drive force with which the photographic optical system L is caused to move along the optical axis O and the vibration sensors 17 and 18 are disposed at positions facing opposite each other over the image-capturing element mounting portion 16*a*. This positional arrangement ensures that the vibration generated as the drive force generating unit 15 is driven is not allowed to be transmitted to the vibration sensors 17 and 18 readily.

(3) Both of the vibration sensors 17 and 18 are disposed around the image-capturing element mounting portion 16*a* within the range R over which the lens barrel unit 2 is projected along the optical axis O of the photographic optical system L. Thus, the lens barrel unit 2 can be provided as a compact unit.

(4) The vibration sensors 17 and 18 are mounted at the sensor board 13 constituted with a hard board, and the sensor board 13 is locked to the member 16 that includes therein the image-capturing element mounting portion 16*a* as an integrated part thereof. Thus, the vibration sensors 17 and 18 fixed to the lens barrel unit 2 enable the adjustment operation and/or the inspection operation related to the blur correction operation to be executed on the lens barrel unit 2 by itself with a high degree of accuracy.

(5) The lens barrel unit 2 includes the terminal unit 12*a* through which an electrical connection with an external device is achieved. With the power supply and the control communication achieved via the terminal unit 12*a*, the adjustment operation and/or an inspection operation related to the blur correction operation can be executed based upon the results of the detection obtained by the vibration sensors 17 and 18. As a result, it becomes easier to handle the lens barrel unit 2 during the manufacturing process and, at the same time, the manufacturing costs can be reduced since any problem related to the blur correction mechanism can be spotted before all the components are assembled into a finished camera product.

The above described embodiments are examples and various modifications can be made without departing from the spirit and scope of the invention.

What is claimed is:

1. A lens barrel unit, comprising:
 a photographic optical system;
 a drive force generating unit that generates a drive force with which the photographic optical system is caused to move along a direction of an optical axis of the photographic optical system;
 a drive mechanism that moves the photographic optical system with the drive force received from the drive force generating unit;
 an image-capturing element mounting portion on which an image-capturing element that captures an image obtained through the photographic optical system is mounted;
 a vibration detection device that detects vibration, and is disposed in a space defined between an outer perimeter of the lens barrel unit and an outer perimeter of the image-capturing element mounting portion in a direction perpendicular to the optical axis, with the outer perimeter of the lens barrel unit being larger than the outer perimeter of the image-capturing element mounting portion; and
 an end member that is provided transverse to the optical axis at an end of the lens barrel unit toward the image-capturing element, the end member having a portion with a flat plate shape with a surface of the portion with the flat plate shape facing toward the image-capturing element, wherein
 the image-capturing element mounting portion is formed on the end member in a region surrounding the optical axis so as to project toward the image-capturing element from the end member,
 the drive force generating unit comprises a first actuator and a second actuator, with an extent of vibration caused by operation of the second actuator being greater than an extent of vibration caused by operation of the first actuator,
 the second actuator and the vibration detection device are disposed on the surface of the portion with the flat plate shape of the end member facing toward the image-capturing element at positions facing opposite each other over the image-capturing element mounting portion, and
 the vibration detection device is disposed on a board connected to the surface of the portion with the flat plate shape of the end member facing toward the image-capturing element, and is positioned in the space so as to overlap the image-capturing element mounting portion in the direction perpendicular to the optical axis.

2. A lens barrel unit according to claim 1, wherein:
 the vibration detection device includes two vibration sensors; and
 the vibration sensors are both disposed in the space.

3. A lens barrel unit according to claim 2, wherein:
 the two vibration sensors are mounted on the board, and the board is a hard board; and
 the board is fixed onto the end member as an integrated part thereof.

4. A lens barrel unit according to claim 1, further comprising:
 a terminal unit that achieves an electrical connection with an external device, wherein:
 at least one of an adjustment operation and an inspection operation related to a blur correction operation is executed based upon detection results provided by the vibration detection device with power supply and control communication achieved via the terminal unit.

5. A lens barrel unit according to claim 1, further comprising:
 a retract motor that generates a drive force to reduce a length of the lens barrel unit.

6. A lens barrel unit according to claim 1, further comprising:
 a blur correction optical system that is included in the photographic optical system, wherein the vibration detection device detects vibration occurring along two directions perpendicular to the optical axis; and
 a blur correction drive unit that drives the blur correction optical system in correspondence to a detection value provided by the vibration detection device.

7. A camera comprising:
 a lens barrel unit according to claim 1 that is built in the camera.

8. A camera according to claim 7, further comprising:
 a camera control board at which a circuit for controlling main operations of the camera is formed, wherein the camera control board is fixed to the image-capturing element mounting portion.

* * * * *